(12) United States Patent
Wijnberg

(10) Patent No.: US 6,527,946 B1
(45) Date of Patent: Mar. 4, 2003

(54) DEVICE FOR TREATING A FLUID

(75) Inventor: Bernard Pieter Wijnberg, Haarlem (NL)

(73) Assignee: Torus B.V., Haarlem (NL)

( * ) Notice: Subject to any disclaimer, the term of this patent is extended or adjusted under 35 U.S.C. 154(b) by 0 days.

(21) Appl. No.: 09/647,055

(22) PCT Filed: Mar. 25, 1999

(86) PCT No.: PCT/NL99/00170

§ 371 (c)(1),
(2), (4) Date: Dec. 19, 2000

(87) PCT Pub. No.: WO99/48585

PCT Pub. Date: Sep. 30, 1999

(30) Foreign Application Priority Data

Mar. 25, 1998 (NL) .............................................. 1008704

(51) Int. Cl.[7] .............................................. B01D 15/08

(52) U.S. Cl. ........................ 210/91; 210/198.2; 210/657

(58) Field of Search ........................... 210/91, 143, 145, 210/198.2, 635, 656, 657, 658; 422/69, 70; 73/61.52, 61.56

(56) References Cited

U.S. PATENT DOCUMENTS 5,186,824 A * 2/1993 Anderson et al. .......... 210/657

FOREIGN PATENT DOCUMENTS

| EP | 0 076 451 | 4/1983 |
| FR | 1 506 445 | 12/1967 |
| GB | 2 108 659 | 5/1983 |

* cited by examiner

Primary Examiner—Joseph W. Drodge
(74) Attorney, Agent, or Firm—Heller Ehrman White & McAuliffe LLP

(57) ABSTRACT

Device for treating a fluid, including a number of columns which are arranged on a support frame and through which the fluid is guided. This support frame rotates with respect to the environment and communication with the environment is achieved by means of a valve. This valve encompasses a plate which is rotationally fixed to the support frame and opposite to which there is a plate whose feed and discharge is in communication with the environment. This latter plate, or auxiliary member, can execute a limited reciprocating rotation, in order to achieve an indexing movement with respect to the first plate. These movements are realized with electromotors and wherein position sensors are provided.

8 Claims, 2 Drawing Sheets

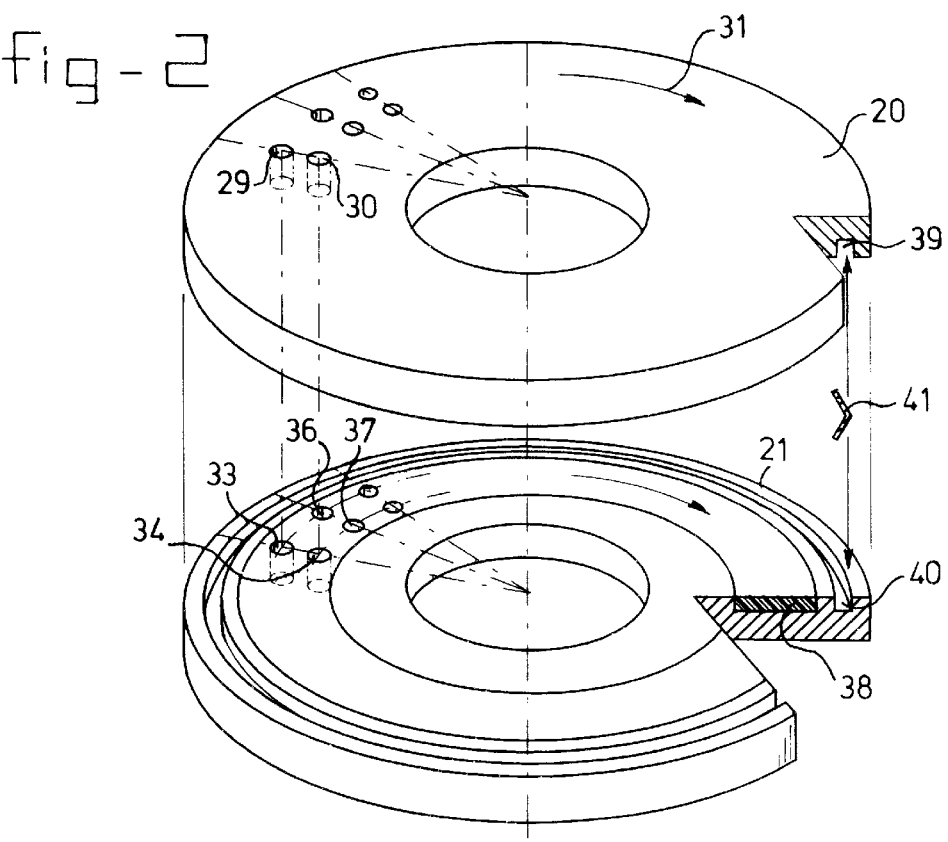
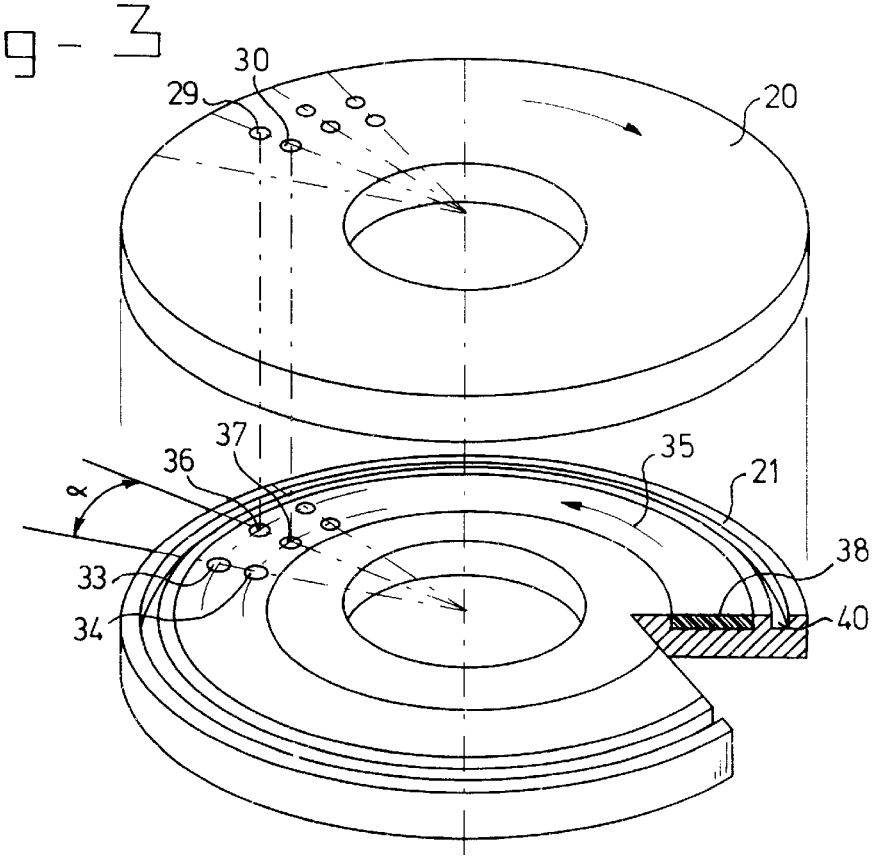

DEVICE FOR TREATING A FLUID

This application is a 371 of PCT/NL99/00170, filed on Mar. 25, 1999.

BACKGROUND OF THE INVENTION

The present invention relates to a device for treating a fluid.

Such a device is known from the French patent specification 1,506,445. This specification discloses a device wherein a common drive is provided for both the rotation of the rotational member and the indexing movement of the auxiliary members. This drive comprises an electromagnet and a spring. The rotational movement is realized by the continuous pressure force of the spring. With a detent mechanism the rotating member is connected with the driving move of the spring. The spring is compressed by retracting the electromagnet by energization. During this retracting movement the auxiliary member also moves back but because of the detent mechanism desribed above this is not true for the rotating member. This device is a laboratory device, i.e. analytically for very small quantities of material. During the return movement by the electromagnetic force the rotating member will move slower and probably even stop. The return movement is a very fast uncontrolled movement.

It is not possible to upscale such a structure. Upscaling means industrial application of chromatography columns. Columns are used having a size of e.g. a meter and a diameter of some centimeters up to a meter or more. The rotating member, the support frame respectively on which such columns are provided, can have a weight of many hundreds of kilos to hundreds of tons. The indexing movement according to the French patent specification 1,506,445 is not possible therein. During the fast return movement, as is realized with the electomagnetic force, unacceptable damage will occur at the separation face between the rotating member and the auxiliary member.

SUMMARY OF THE INVENTION

The subject inventions aims to provide a device which can be used on industrial 'large' scale and wherein the to-and fro movement of the auxiliary member as described above is possible.

This aim is realised with a device as described above having the characteristic features of claim 1. It is suggested to use sensors and have these sensors to effect the movement of the auxiliary member, the rotating member respectively because in an industrial apparatus, the movement of the rotating member with regard to the auxiliary member is difficult to control. In this way it is possible to realize the openings of the auxilliary member and rotating member, being opposite to each other with about the same size. This in contrast to the structure described in the French patent specification 1,506,445, wherein one of said members is provided with a ring-shaped duct, such that the opening in the other member can be placed in different positions, wherein still a fluidium connecting remains. If a larger number of openings is used such a structure is not desired.

According to a preferred embodiment of the invention the rotating member executes, in view of its large mass, a continuous rotating movement. This can simply be realised with an electromotor or servomotor. The indexing member can be moved along during the movement by the rotating member, but is also possible to use another movement to that end. The fro movement of the auxiliary member is realised according to a preferred embodiment of the invention by an electromotor, being controlled by the controll as described above. Sensors are provided taking care that it is guaranteed that after the return movement the several openings of the auxiliary member and rotating member are exactly aligned above each other. It is possible to determine the position during each return movement with reference to the sensors. The sensors can generate a number of pulses for each motor revolution. These pulses are counted and control both motors both with regard to speed and position. Sensor as used above and the following description can comprise each device being known in the prior art.

According to the invention the auxiliary member, i.e. the 'stationary' valve plate, realizes a rotation over a restricted angle. Because of that this valve plate realises an indexing movement. This structure can be realized relatively simple and space saving.

A further simplification can be obtained if the valve plate or auxiliary member is provided near the lower side of the columns. Because of that the structure can be realised in a compact way and is simply accessible for service purposes. This is particularly true if higher apparatus are used having a height of e.g. 2–7,5 meters.

With the auxiliary member, stationary valve plate respectively all movements being of importance can be realised. I.e. the stationary valve plate or the auxiliary member follows the rotation of the rotating valve plate or the rotating member over a determined angle and subsequently indexes back with the same angle to effect that the first openings of the rotating members during the first part of this movement are opposite to the first openings of the auxiliary member and to realise after indexing movement that the first openings of the rotating member are opposite to the second openings of the auxiliary member.

The stationary valve plate will be placed in communication with the environment in particular with the aid of flexible hoses, with the result that the limited rotation is permissible.

Controlling the various movements in accordance with the present invention can be considerably simplified with respect to that which is known in the prior art. There are considerably fewer synchronization problems. In the prior art, it is necessary to take special measures in order to avoid problems if the signal for the return movement is not transmitted, or is transmitted too quickly. In the present structure, simple means are sufficient to control the various movements with respect to one another.

To control the above features, sensor means may be present on both the support frame and the auxiliary member. Naturally, locking means or other structures may also be present in order to effect coupling between the auxiliary member and the support frame or the rotating member. However, this will not be necessary for most applications, and the various openings can be brought to lie precisely opposite one another by controlling the drive motor of either the auxiliary member or of the rotating member, or of both. Any inaccuracy could still be eliminated by designing the openings partially in the form of slots.

The above-described limited angle through which the auxiliary member moves with respect to the environment is determined by the number of columns. This angle can be smaller for a larger number of columns.

According to a preferred embodiment of the invention between the auxiliary member and the rotating member a teflon ring is provided. This functions as bearing ring. The friction reducing properties of Teflon are very good as well as its sealing properties. However, it has been found that the speed of the object being the other side of the bearing, i.e. the part sliding over the Teflon should not be too large because otherwise an unacceptable damage of the Teflon ring occurs. If the speed of an energized electromagnet would be used, as known e.g. from the French patent specification 1,506,445, such a damage would occur. By using for example a slower rotating electromotor such damage is avoided.

BRIEF DESCRIPTION OF THE DRAWINGS

The invention will be explained in more detail below with reference to an exemplary embodiment which is depicted in the drawing, in which:

FIG. 2 shows a first top view of the rotating member and the auxiliary member in a first position; and FIG. 3 shows the view in accordance with FIG. 2 in a second position.

DETAILED DESCRIPTION OF THE INVENTION

Figure 1:
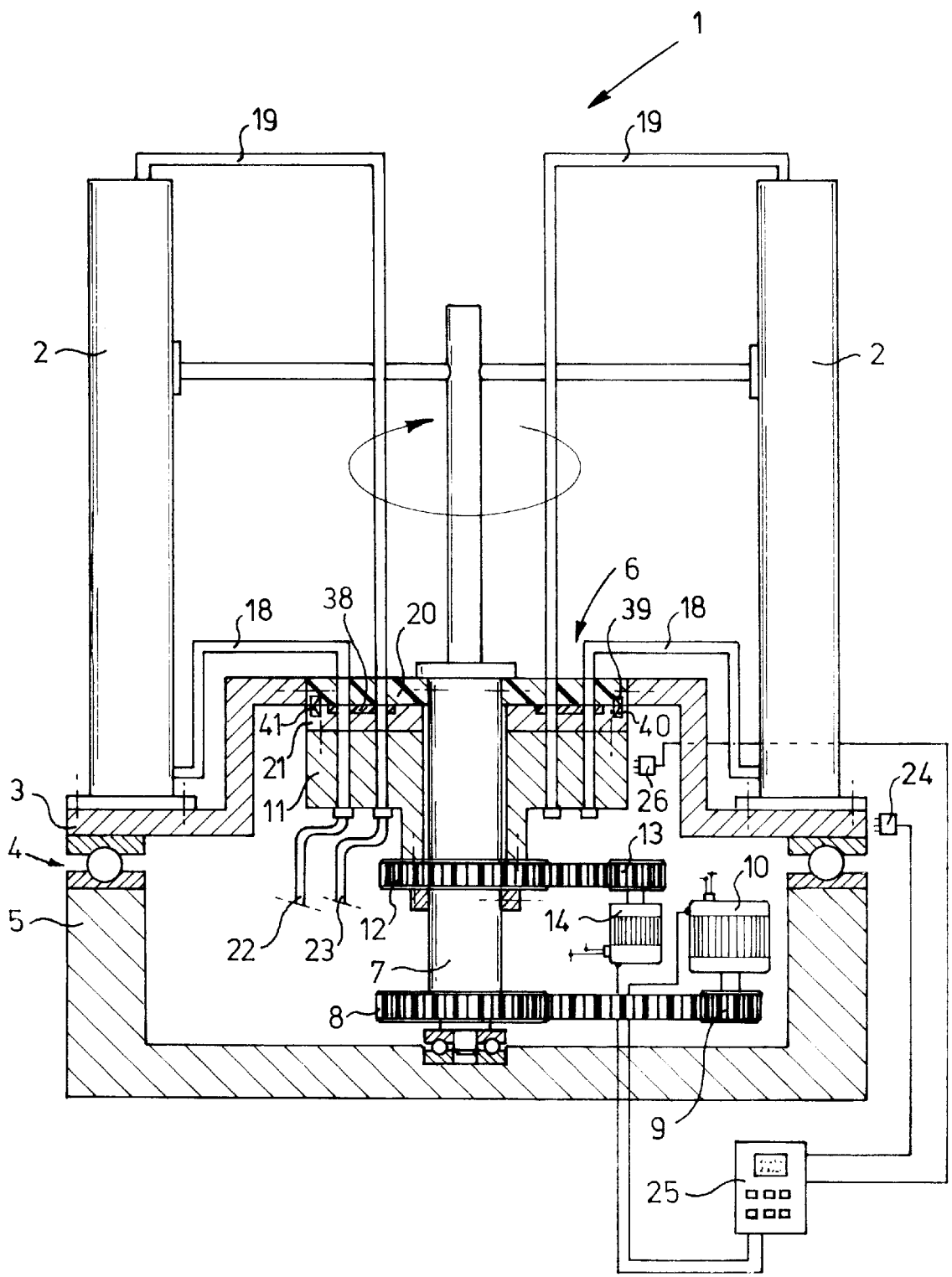
FIG. 1 shows a side view of a cross-section of an embodiment of the present invention.

In FIG. 1, the device according to the present invention is denoted overall by 1. The most important part comprises a number of columns 2, in which a chemical and/or physical reaction is to be carried out with a fluid which is guided through a column of this kind. The columns 2 are supported on a support frame 3, which in turn is supported on a base 5 with the aid of bearing 4, which is depicted very schematically. Support frame 3, and also the columns, are disposed in a rotatable manner, so that the fluid can undergo various successive treatments. In order to provide communication with the environment, a rotary valve denoted overall by 6 is present.

The structure shown here rotates about shaft 7. On one side, this shaft 7 is rigidly connected to the support frame 3, and on the other side it is provided with a pulley 8. Naturally, a suitable bearing is also present. Pulley 8 is connected via a belt to a pulley 9 of drive motor 10. A bush 11 is arranged around shaft 7, which bush is rotatable with respect to the shaft and, via pulleys 12 and 13, can be driven by means of motor 14. This means that in the structure shown here the support frame 3 can rotate independently of bush 11.

Column 2 is provided with lines 18 and 19, which open out in the top disk or top valve plate of rotary valve 6. This top disk 20 is preferably made of plastic. This disk is connected in a rotationally fixed manner to shaft 7, and therefore executes the same rotary movement as the support frame 3. This disk is provided with openings which correspond to the lines 18, 19. Two of these openings are denoted by 29 and 30 in FIGS. 2 and 3.

This disk adjoins the stationary or auxiliary disk 21 in a sealed manner. This auxiliary disk 21 is preferably made of a metallic material, such as steel, Hastelloy and other materials known in the prior art. If appropriate, a further disk may be placed between disks 20 and 21. It is possible to provide a Teflon ring being shown with 38 in the figures. This ring functions as bearing and sealing ring between the discs 20 and 21. Furthermore a sealing can be provided in the recesses 39 and 40 in rotating portion 20 and auxiliary portion 21 respectively. This can for example be a radial sealing being referred to by 41. Disk 21 is connected in a rotationally fixed manner to bush 11. Disk 21 is likewise provided with openings, which in FIGS. 2 and 3 are denoted by 33, 34, 36, 37. These openings are adjoined by lines 22 and 23, which are flexible to some extent. All this is designed in such a way that disk 21 can rotate in a reciprocating manner through a limited angle without placing excess load on these lines 22 and 23. Lines 22 and 23 are respectively connected to the source and discharge of the fluid in question.

Sensor 24 measures the position of the support frame 3, while sensor 26 determines the position of bush 11. The resulting signals are transmitted to control unit 25, which governs the rotation of motor 14. Control system 25 may also be used to control the rotation of motor 10.

FIGS. 2 and 3 show a somewhat enlarged view of the disks 20 and 21 and the abovementioned openings 29 and 30 in disk 20 and 33, 34 and 36, 37 in disk 21.

The above-described device functions as follows. Starting from a first position shown in FIG. 1, motor 10 rotates continuously, i.e. the support frame executes a continuous rotating movement This movement is indicated in FIG. 2 with the aid of arrow 31.

The first part of this movement is followed by disk 21, i.e. motor 14 is controlled in such a manner by means of control system 25 that disk 21 moves at essentially the same speed as disk 20 during this first part of the movement As a result, openings 29 and 30 are aligned with openings 33, 34. Control can be effected by means of signals emanating from sensors 24 and 26. After the disk 20 has covered a predetermined angle, which angle preferably satisfies the following equation: $\alpha = 360/n°$, where n is the number of columns 2, disk 20 continues its rotating movement, since support frame 3 executes a continuous rotating movement However, the movement of disk 21 is stopped, and this disk is moved quickly backwards in the direction of arrow 35, so that openings 29 and 30 are aligned with openings 36 and 37 (FIG. 3). Then, the slower rotating movement of disk 20 is again followed by disk 21 until the above-described angle has been covered, after which an indexing movement of this kind takes place once again.

If appropriate, the above-described openings 29, 30, 33, 34 and 36, 37 may be of slot-shaped design.

It will be understood that in this way interruption to the fluid flow is limited to a minimum, thus optimizing the reaction time. Moreover, the device can be of relatively simple design without the need for extra structural measures.

It is also possible to convert existing installations without too much difficulty, so as to increase their performance.

Although the invention is described above with reference to a preferred embodiment, it will be understood by a person skilled in the art that it is possible to make numerous modifications which are obvious to the person skilled in the art. In particular, for example, there are numerous design variants for swivel or valve 6. All such variants are considered to lie within the scope of the appended claims.

I claim:

1. A device for treating a fluid, comprising:
   a support frame capable of rotary movement about an axis;
   a rotating member following the rotary movement of the support frame about the axis;
   a plurality of columns through which the fluid is guided, the columns being mounted on the support frame and being provided with feed and discharge lines connected to the rotating member;
   an auxiliary member, following the rotary movement of the rotating member about the axis through a limited angle a and subsequently returning to its original angular position, the rotating member and the auxiliary member being provided with cooperating openings for the feed and discharge of the fluid, and the auxiliary member being connected to stationary feed and discharge lines for the fluid;

at least one sensor determining the angular position of the rotating member and/or the auxiliary member about the axis; and a control, connected to the at least one sensor and controlling the rotary movement of the rotating member and/or the auxiliary member about the axis.

2. The device of claim 1 where the auxiliary member is driven by an electric motor controlled by the control.

3. The device of claim 1 where the rotating member is driven by a continuous drive.

4. The device of claim 1 where the stationary feed and discharge lines are flexible hoses.

5. The device of claim 1 where the at least one sensor determines the position of both the rotating member and the auxiliary member and the control controls the movement of both the rotating member and the auxiliary member.

6. The device of claim 1 where the rotating member is connected to the support frame.

7. The device of claim 1 where the rotating member is positioned below the columns.

8. The device of claim 1 where the limited angle $\alpha$ is $(360/n)°$, where n is the number of columns on the support frame.

* * * * *